(12) United States Patent
Kaihotsu et al.

(10) Patent No.: US 9,343,205 B2
(45) Date of Patent: May 17, 2016

(54) TUBULAR CABLE PROTECTION AND GUIDE DEVICE

(71) Applicant: TSUBAKIMOTO CHAIN CO., Osaka (JP)

(72) Inventors: Kouichi Kaihotsu, Osaka (JP); Shoichiro Komiya, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 121 days.

(21) Appl. No.: 14/184,687

(22) Filed: Feb. 19, 2014

(65) Prior Publication Data

US 2014/0262421 A1    Sep. 18, 2014

(30) Foreign Application Priority Data

Mar. 13, 2013    (JP) .................................. 2013-050250

(51) Int. Cl.
*H01B 17/58*    (2006.01)
*H02G 3/04*    (2006.01)
*H02G 11/00*    (2006.01)

(52) U.S. Cl.
CPC ............. *H01B 17/58* (2013.01); *H02G 3/0487* (2013.01); *H02G 3/0418* (2013.01); *H02G 11/006* (2013.01)

(58) Field of Classification Search
CPC ..... H01B 17/58; H02G 3/0487; H02G 3/0475
USPC ............................................... 174/68.1, 68.3
See application file for complete search history.

(56) References Cited

U.S. PATENT DOCUMENTS

| 6,032,702 | A  |   | 3/2000 | Bearden |         |
|-----------|----|---|--------|---------|---------|
| 6,107,576 | A  | * | 8/2000 | Morton et al. | ................ 174/101 |
| 7,559,340 | B2 | * | 7/2009 | Ikeda et al. | .................. 138/110 |

FOREIGN PATENT DOCUMENTS

| JP | H06-009321   | 2/1994  |
|----|--------------|---------|
| JP | 2008-199869  | 8/2008  |
| JP | 2008-267436  | 11/2008 |
| JP | 2009-291060  | 12/2009 |

(Continued)

OTHER PUBLICATIONS

"Office Action of Taiwan Counterpart Application", issued on Aug. 20, 2015, with English translation thereof, p. 1-p. 11.

(Continued)

*Primary Examiner* — Dhirubhai R Patel
(74) *Attorney, Agent, or Firm* — Jiang Chyun Intellectual Property Office

(57) ABSTRACT

A tubular cable protection and guide device is provided. The tubular cable protection and cable device includes an elastomer resin sheet that has: an outer circumference wall forming portion, a pair of sidewall forming portions on the left and right sides, and a pair of inner circumference wall forming portions on the left and right sides. The inner circumference wall forming portions have a pair of locking portions. When a cable receiving room is formed, the pair of locking portions is engaged with each other along a sheet longitudinal direction on a flexional inner circumference side, such that the inner circumference wall forming portions form a wall facing the outer circumference wall forming portion. The locking portions each includes a plurality of ridges that extend in the sheet longitudinal direction and are arranged in the transverse direction to be alternately inserted between each other when engaged with each other.

7 Claims, 8 Drawing Sheets

(56) References Cited

FOREIGN PATENT DOCUMENTS

| | | |
|---|---|---|
| KR | 10-2008-0093862 | 10/2008 |
| TW | 200843231 | 11/2008 |

OTHER PUBLICATIONS

"Office Action of Korea Counterpart Application", mailed on Nov. 24, 2015, pp. 1-8, with English translation thereof.

* cited by examiner

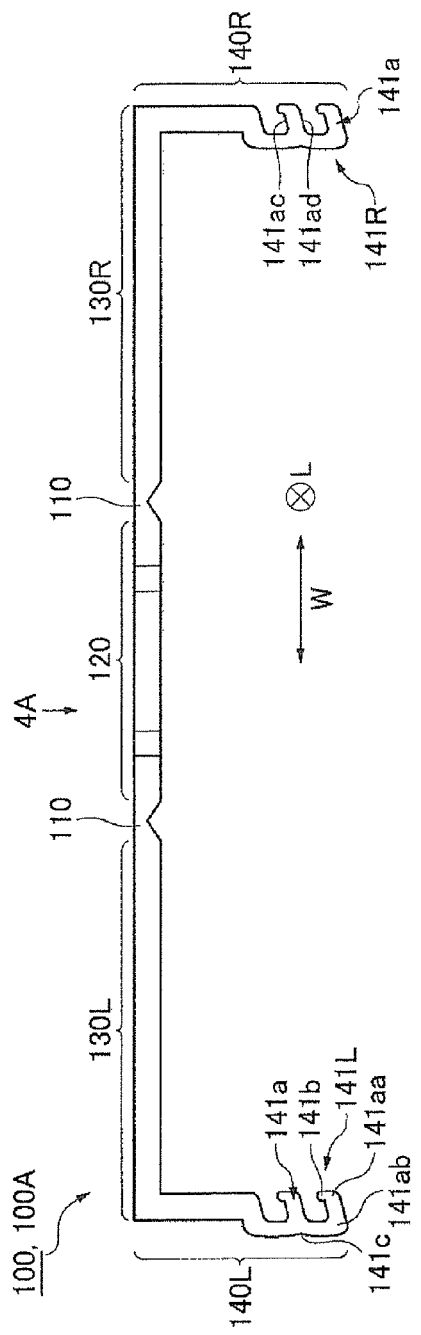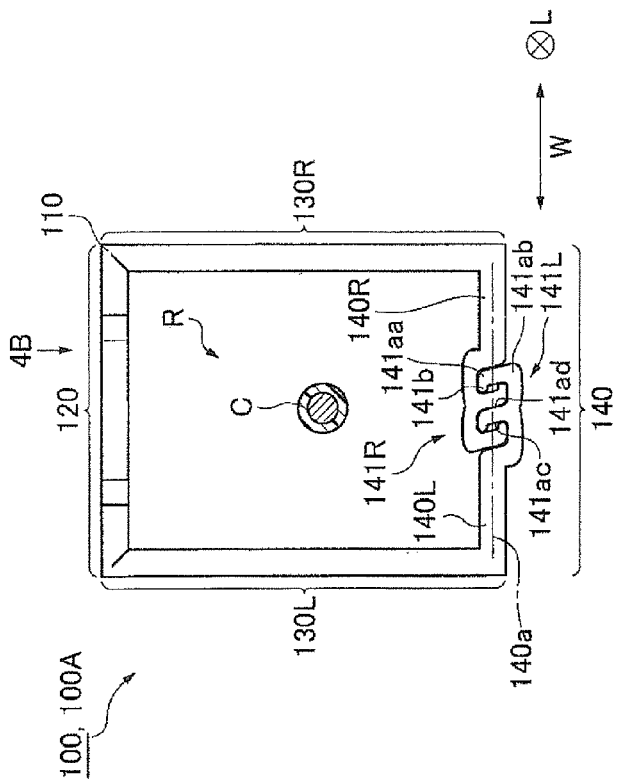

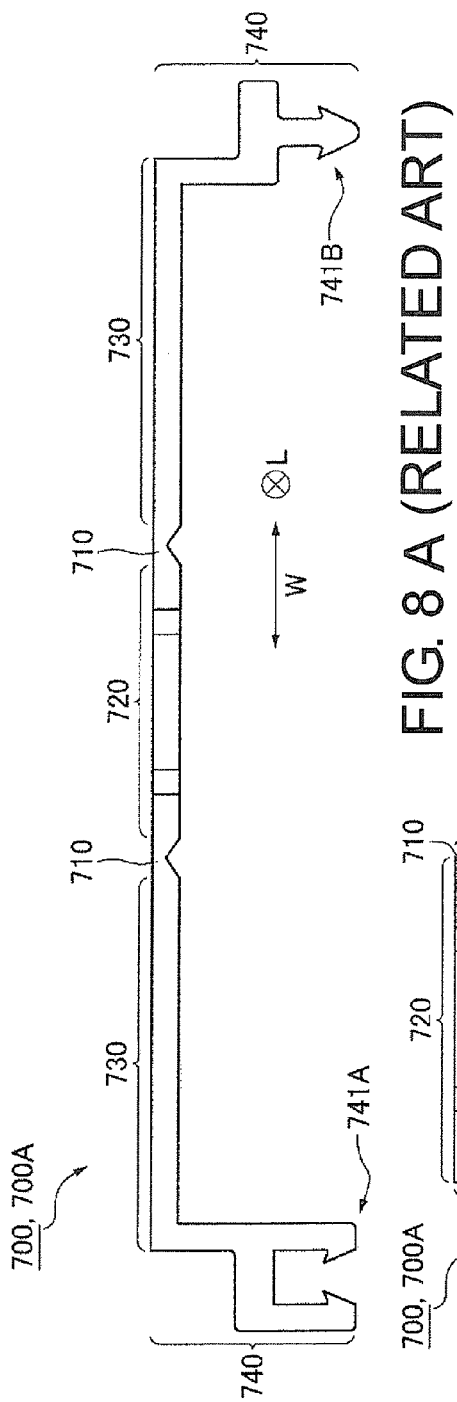
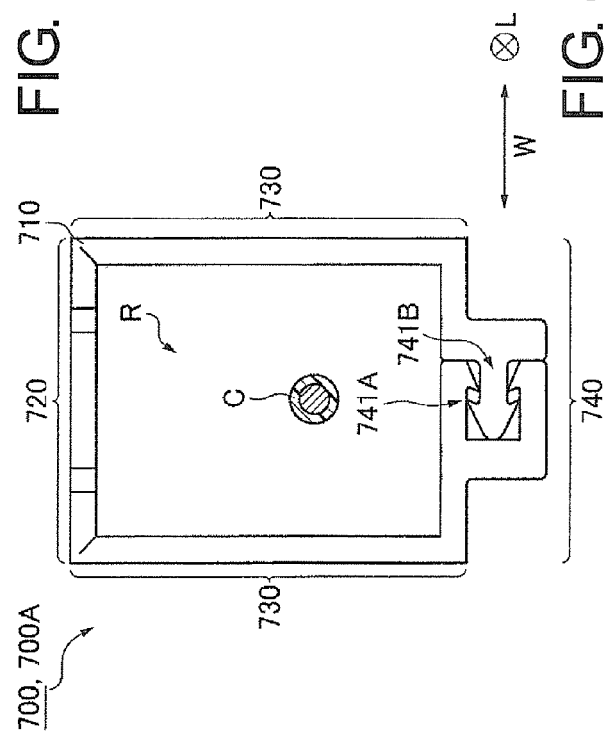
FIG. 8A (RELATED ART)
FIG. 8B (RELATED ART)

TUBULAR CABLE PROTECTION AND GUIDE DEVICE

CROSS-REFERENCE TO RELATED APPLICATIONS

This application claims the priority benefit of Japan application serial no. 2013-050250, filed on Mar. 13, 2013. The entirety of the above-mentioned patent application is hereby incorporated by reference herein and made a part of this specification.

BACKGROUND OF THE INVENTION

1. Field of the Invention

The present invention relates to a cable protection and guide device that is adapted for receiving relatively light and small-diameter cables, such as a cable for supplying electric power or a hose for supplying energy of compressed air to a movable member of a semiconductor fabrication apparatus, a pharmaceutical development and test apparatus, a vehicle door opening and closing device, a vehicle slide seat, or a vehicle electric sunroof, etc., and securely guiding and protecting the cables during movement of the movable member.

2. Description of Related Art

The conventional tubular cable protection and guide device is configured iteratively in a linear position and a flexional position and receive cables along a sheet longitudinal direction in a cable receiving room that is formed by bending two sides of a ruler-shaped elastomer resin sheet formed by extruding in the sheet longitudinal direction (refer to Patent Literatures 1 to 3, for example).

A tubular cable protection and guide device 700, as illustrated in FIG. 8A and FIG. 8B, is an example of the conventional tubular cable protection and guide device.

FIG. 8A is a schematic diagram illustrating a state of the conventional tubular cable protection and guide device 700 before assembly when viewed from a sheet longitudinal direction L. FIG. 8B is a schematic diagram illustrating a state of the conventional tubular cable protection and guide device 700 after assembly when viewed from the sheet longitudinal direction L.

The conventional tubular cable protection and guide device 700 includes an elastomer resin sheet 700A that has an outer circumference wall forming portion 720, a pair of bending portions 710 on the left and right sides, a pair of sidewall forming portions 730 on the left and right sides, and inner circumference wall forming portions 740.

The outer circumference wall forming portion 720 is configured to be connected in the sheet longitudinal direction L when the linear position is performed, and expanded and separated by a predetermined pitch in the sheet longitudinal direction L on a flexional outer circumference side when the tubular cable protection and guide device is configured in the flexional position.

Moreover, the bending portions 710 are thin at boundaries between the outer circumference wall forming portion 720 and the respective sidewall forming portions 730 so as to facilitate the bending of the bending portions 710.

The sidewall forming portions 730 that are formed in pair on the left and right sides are connected with two sides of the outer circumference wall forming portion 720. When the tubular cable protection and guide device is configured in the linear position, the respective sidewall forming portion 730 is connected in the sheet longitudinal direction L; and when the tubular cable protection and guide device is configured in the flexional position, the respective sidewall forming portion 730 is expanded and separated by a predetermined pitch in the sheet longitudinal direction L.

In addition, the inner circumference wall forming portions 740 are formed integrally with the respective sidewall forming portions 730 on the left and right sides and are vertical thereto. When a cable receiving room R is formed, the inner circumference wall forming portions 740 are closed with a pair of female inner circumference wall portion 741A and male inner circumference wall portion 741B engaged with each other in the sheet longitudinal direction L on a flexional inner circumference side, so as to form a wall facing the outer circumference wall forming portion 720.

PRIOR ART LITERATURE

Patent Literature

[Patent Literature 1] Japanese Patent Publication No. 2008-267436
[Patent Literature 2] Japanese Patent Publication No. 2008-199869
[Patent Literature 3] Japanese Patent Publication No. 2009-291060

SUMMARY OF THE INVENTION

However, according to the structure of the conventional tubular cable protection and guide device 700 as described above, the female inner circumference wall portion 741A and the male inner circumference wall portion 741B of the inner circumference wall forming portions 740 are engaged at only one point. Thus, when many cables C are stacked in the cable receiving room R, the sidewall forming portions 730 on the left and right sides may be pushed outward by the cables C, causing the female inner circumference wall portion 741A and the male inner circumference wall portion 741B are pulled outward in the transverse direction and may be disengaged from each other. In addition, the engaged female inner circumference wall portion 741A and male inner circumference wall portion 741B are thick, which increases the bending resistance when the tubular cable protection and guide device is configured in the flexional position and makes the bending more difficult.

Considering the above issues, the present invention provides a tubular cable protection and guide device that prevents disengagement of a pair of locking portions when being subjected to an outward pulling force in a transverse direction and has less bending resistance in comparison with the traditional structure.

In view of the above, according to a first aspect of the present invention, a tubular cable protection and guide device is configured iteratively in a linear position and a flexional position and receive a cable or the like along a sheet longitudinal direction in a cable receiving room that is formed by bending two sides of a ruler-shaped elastomer resin sheet formed by extruding in the sheet longitudinal direction. The elastomer resin sheet includes an outer circumference wall forming portion, a pair of sidewall forming portions on the left and right sides, and inner circumference wall forming portions. The outer circumference wall forming portion is connected in the sheet longitudinal direction when the tubular cable protection and guide device is configured in the linear position, and expanded and separated by a predetermined pitch in the sheet longitudinal direction on a flexional outer circumference side when the flexional position is performed. The sidewall forming portions are connected with two sides of the outer circumference wall forming portion. Moreover, when the tubular cable protection and guide device is configured in the linear position, the respective sidewall forming portion is connected in the sheet longitudinal direction; and when the tubular cable protection and guide device is configured in the flexional position, the respective sidewall forming portion is expanded and separated by a predetermined pitch in the sheet longitudinal direction. The inner circumference wall forming portions are formed integrally with the respective sidewall forming portions on the left and right sides and are disposed vertically to the sidewall forming portions. When the cable receiving room is formed, the inner circumference wall forming portions are closed with a pair of locking portions engaged with each other along the sheet longitudinal direction on a flexional inner circumference side, so as to form a wall facing the outer circumference wall forming portion. The pair of locking portions each includes a plurality of ridges that extend in the sheet longitudinal direction and are arranged in a transverse direction when engaged with each other. When engaged with each other, the ridges are alternately inserted between each other.

According to a second aspect of the present invention, in addition to the structure of the tubular cable protection and guide device of the first aspect, a top portion side of each ridge tilts toward a side of the sidewall forming portion, which is connected with the inner circumference wall forming portion with the ridge formed thereon, with respect to a base portion side of the ridge.

According to a third aspect of the present invention, in addition to the structure of the tubular cable protection and guide device of the first or second aspect, two sides of at least one ridge in the transverse direction on one of the pair of locking portions are freely in contact with multiple ridges on the other one of the pair of locking portions.

According to a fourth aspect of the present invention, in addition to the structure of the tubular cable protection and guide device of any one of the first to the third aspects, the pair of locking portions each includes a retaining protrusion that protrudes from the top portion side of each ridge toward the side of the sidewall forming portion that is connected with the inner circumference wall forming portion with the ridge formed thereon.

According to a fifth aspect of the present invention, in addition to the structure of the tubular cable protection and guide device of any one of the first to the fourth aspects, the pair of locking portions is disposed in a point symmetry relationship with any point on a thickness center line of the inner circumference wall forming portion as a reference when viewed from the sheet longitudinal direction.

According to a sixth aspect of the present invention, in addition to the structure of the tubular cable protection and guide device of any one of the first to the fifth aspects, a groove is disposed on an opposite side to the ridges of each of the pair of locking portions in a flexional inner-outer direction, and the groove extends in the sheet longitudinal direction.

Effect of the Invention

With the tubular cable protection and guide device of the present invention that is configured alternately in the linear position and the flexional position and receive a cable or the like along the sheet longitudinal direction in the cable receiving room that is formed by bending two sides of the ruler-shaped elastomer resin sheet formed by extruding in the sheet longitudinal direction, when the cable to be received in the cable receiving room is long, the elastomer resin sheet can be processed and cut into a continuous single piece corresponding to the length of the cable for the cable receiving room with its length to be suitable to receive the cable. Moreover, the tubular cable protection and guide device of the present invention achieves the following particular effects.

In the tubular cable protection and guide device of the first aspect of the present invention, the elastomer resin sheet includes the outer circumference wall forming portion, the pair of sidewall forming portions on the left and right sides, and the inner circumference wall forming portions. The outer circumference wall forming portion is connected in the sheet longitudinal direction when the tubular cable protection and guide device is configured in the linear position, and expanded and separated by the predetermined pitch in the sheet longitudinal direction on the flexional outer circumference side when the tubular cable protection and guide device is configured in the flexional position. The sidewall forming portions are connected with two sides of the outer circumference wall forming portion. Moreover, when the tubular cable protection and guide device is configured in the linear position, the respective sidewall forming portion is connected in the sheet longitudinal direction; and when the tubular cable protection and guide device is configured in the flexional position, the respective sidewall forming portion is expanded and separated by the predetermined pitch in the sheet longitudinal direction. The inner circumference wall forming portions are formed integrally with the respective sidewall forming portions on the left and right sides and are disposed vertically to the sidewall forming portions. The inner circumference wall forming portions have a pair of locking portions. When the cable receiving room is formed, the pair of locking portions is engaged with each other along the sheet longitudinal direction on the flexional inner circumference side, such that the inner circumference wall forming portions form the wall facing the outer circumference wall forming portion. In addition, the pair of locking portions each includes a plurality of ridges that extend in the sheet longitudinal direction and are arranged in the transverse direction when engaged with each other. When engaged with each other, the ridges are alternately inserted between each other. Since there are multiple engagement points, disengagement of the pair of locking portions can be prevented even when an outward pulling force in the transverse direction is applied.

Furthermore, because the thickness of the pair of locking portions is made thinner than the traditional structure, the bending resistance of the tubular cable protection and guide device when the tubular cable protection and guide device is configured in the flexional position can be reduced.

According to the tubular cable protection and guide device of the second aspect of the present invention, in addition to the effects of the first aspect, the top portion side of each ridge tilts toward the side of the sidewall forming portion with respect to a base portion side of the ridge, wherein the side of the sidewall forming portion is connected with the inner circumference wall forming portion with the ridge formed thereon. Thus, the ridge tilts like a hook with respect to a vertical direction of a wall of the inner circumference wall forming portion. When an outward pulling force in the transverse direction is applied, the top portion side of the ridge is respectively caught by the base portion side of another ridge to strengthen the engagement, thereby further preventing disengagement of the pair of locking portions.

When changing to the flexional position, forces are generated to eliminate a difference between the flexional outer and inner circumferences with respect to the top portion side and the base portion side of the ridge, and the ridge is deformed to tilt toward the top portion side of the ridge and to tilt with respect to the base portion side. Because the ridge on one of the locking portions and the wall of the inner circumference wall forming portion clamp the ridge on the other locking portion that is engaged with the ridge on said one locking portion, the disengagement of the pair of locking portions can be further prevented.

In addition, when the tubular cable protection and guide device is configured in the flexional position, the tilt of the ridge with respect to the vertical direction of the inner circumference wall forming portion is steep and strengthens the engagement. Therefore, the engagement force in the flexional position is increased.

According to the tubular cable protection and guide device of the third aspect of the present invention, in addition to the effects of the first or second aspect, two sides of at least one ridge in the transverse direction on one of the pair of locking portions are freely in contact with multiple ridges on the other one of the pair of locking portions. When an outward pulling force in the transverse direction is applied, the ridge on one of the locking portions is pressed by one ridge on the other one of the locking portions at an upstream side of the force in the transverse direction and comes in close contact with another ridge at a downstream side of the force in the transverse direction, and thus the ridge on one of the locking portions is tightly clamped by multiple ridges on the other one of the locking portions. Therefore, disengagement of the pair of locking portions can be prevented even if an outward pulling force in the transverse direction is applied.

According to the tubular cable protection and guide device of the fourth aspect of the present invention, in addition to the effects of any one of the first to the third aspects, the pair of locking portions each includes the retaining protrusion that protrudes from the top portion side of each ridge toward the side of the sidewall forming portion that is connected with the inner circumference wall forming portion with the ridge formed thereon. If the outward pulling force in the transverse direction increases and is separating the engaged locking portions, the retaining protrusions of the locking portions can be engaged with each other to maintain a relative position relationship thereof, so as to prevent the engaged locking portions from being separated apart.

According to the tubular cable protection and guide device of the fifth aspect of the present invention, in addition to the effects of any one of the first to the fourth aspects, the pair of locking portions is disposed in a point symmetry relationship with any point on a thickness center line of the inner circumference wall forming portion as a reference when viewed from the sheet longitudinal direction. The thickness of the inner circumference wall forming portion on the flexional inner circumference side and the flexional outer circumference side is well distributed and balanced with respect to the thickness center line of the inner circumference wall forming portion, and the bending resistance is reduced and no excessive force is generated. As a result, the tubular cable protection and guide device can be smoothly bent from the linear position to the flexional position.

According to the tubular cable protection and guide device of the sixth aspect of the present invention, in addition to the effects of any one of the first to the fifth aspects, the groove is disposed on the opposite side to the ridges of each of the pair of locking portions in the flexional inner-outer direction, and the groove extends in the sheet longitudinal direction. Accordingly, the resistance of elastic deformation that is generated when expanding the space between the top portions of adjacent ridges is reduced, and the gap between the top portions of adjacent ridges can be easily expanded to allow the ridges respectively on the pair of locking portions to be alternately inserted between each other for engagement.

BRIEF DESCRIPTION OF THE DRAWINGS

FIG. 3A is a schematic view from the direction 3A of FIG. 1.

FIG. 3B is a schematic view from the direction 3B of FIG. 2.

FIGS. 8A and 8B respectively illustrate schematic views of the conventional tubular cable protection and guide device before and after assembly.

DESCRIPTION OF THE EMBODIMENTS

Figure 1:
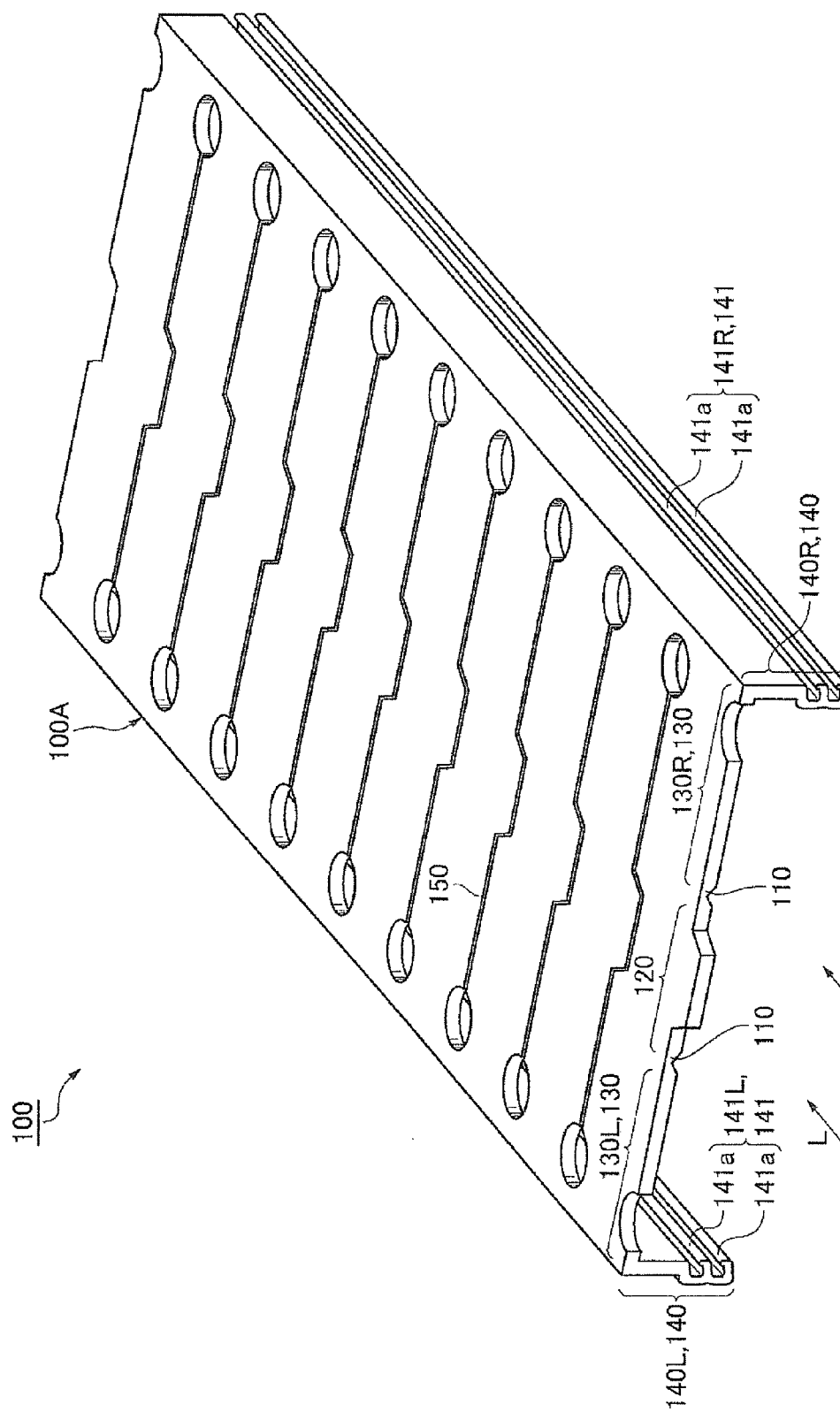
FIG. 1 is a perspective view illustrating a state of a tubular cable protection and guide device before assembly in an embodiment of the present invention.
Figure 2:
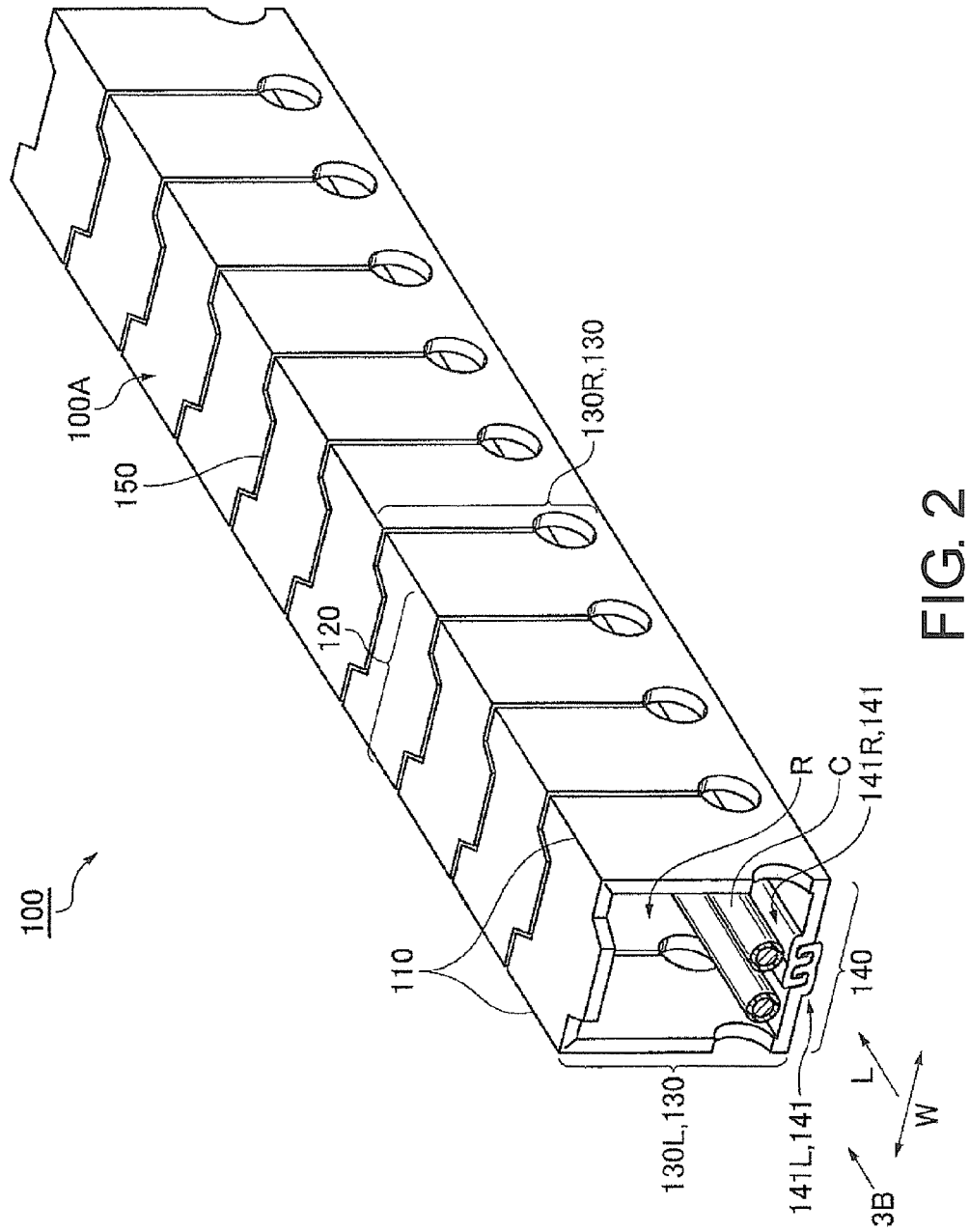
FIG. 2 is a perspective view illustrating a state of the tubular cable protection and guide device after assembly in an embodiment of the present invention.
Figure 4:
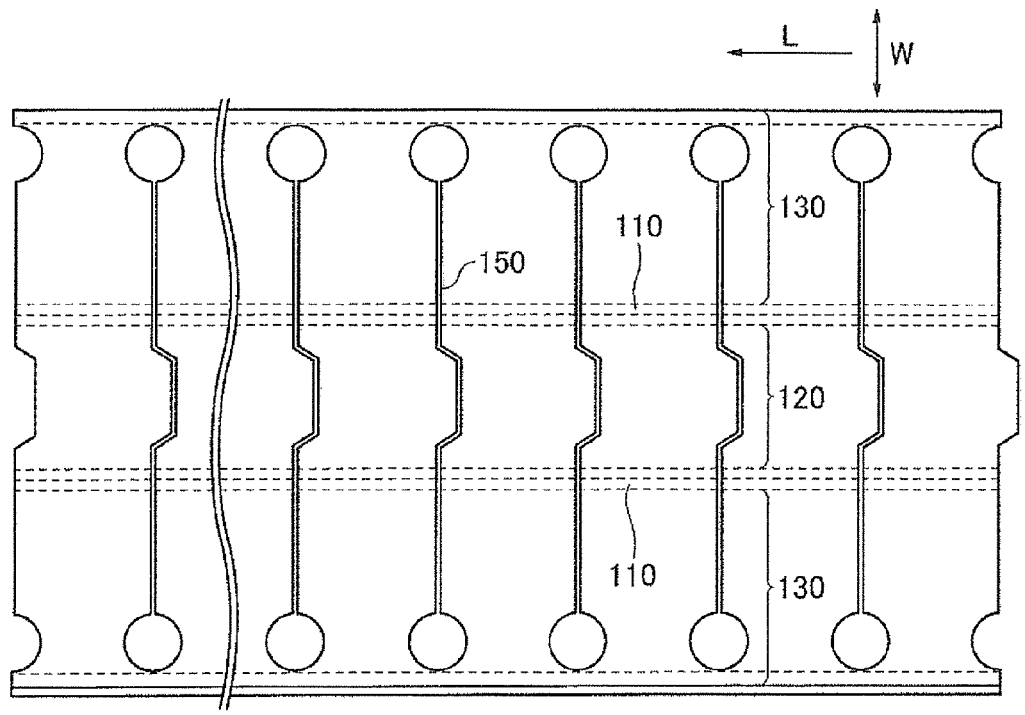
FIG. 4A is a schematic view from the direction 4A of FIG. 3A.
FIG. 4B is a schematic view from the direction 4B of FIG. 3B.
Figure 4:
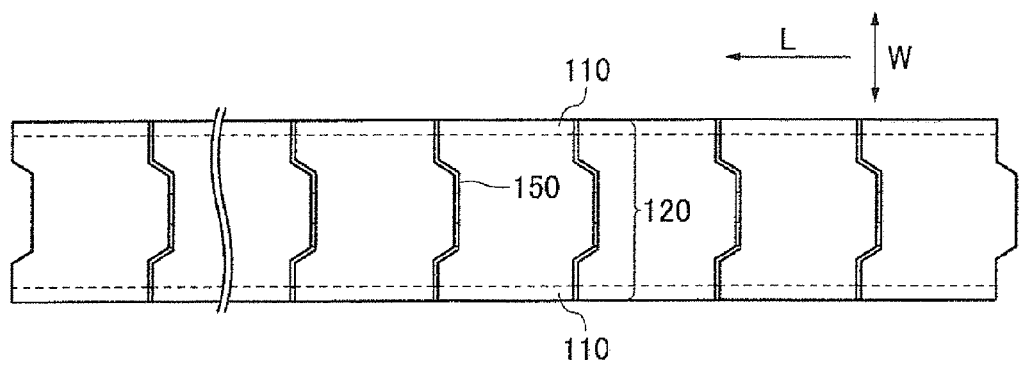

A tubular cable protection and guide device of the present invention is not particularly limited as long as the tubular cable protection and guide device is configured to iteratively perform a linear position and a flexional position and to receive a cable or the like along a sheet longitudinal direction in a cable receiving room that is formed by bending two sides of a ruler-shaped elastomer resin sheet formed by extruding in the sheet longitudinal direction, wherein the elastomer resin sheet includes an outer circumference wall forming portion, a pair of sidewall forming portions on the left and right sides, and inner circumference wall forming portions. The outer circumference wall forming portion is connected in the sheet longitudinal direction when the tubular cable protection and guide device is configured in the linear position, and expanded and separated by a predetermined pitch in the sheet longitudinal direction on a flexional outer circumference side when the tubular cable protection and guide device is configured in the flexional position. The sidewall forming portions are connected with two sides of the outer circumference wall forming portion. Moreover, when the tubular cable protection and guide device is configured in the linear position, the respective sidewall forming portion is connected in the sheet longitudinal direction; and when the tubular cable protection and guide device is configured in the flexional position, the respective sidewall forming portion is expanded and separated by a predetermined pitch in the sheet longitudinal direction. The inner circumference wall forming portions are formed integrally with the respective sidewall forming portions on the left and right sides and are disposed vertically to the sidewall forming portions. When the cable receiving room is formed, the inner circumference wall forming portions are closed with a pair of locking portions engaged with each other along the sheet longitudinal direction on a flexional inner circumference side, so as to form a wall facing the outer circumference wall forming portion. The pair of locking portions each includes a plurality of ridges that extend in the sheet longitudinal direction and are arranged in a transverse direction when engaged with each other. When engaged with each other, the ridges are alternately inserted between each other. Thereby, the locking portions of the tubular cable protection and guide device are prevented from being disengagement of even when the locking portions are subjected to an outward pulling force in the transverse direction and has less bending resistance in comparison with the traditional structure.

For example, a bending form of a pair of bending portions that extends on the left and ride sides of the elastomer resin sheet of the tubular cable protection and guide device of the present invention is not particularly limited as long as the sidewall forming portions are upright with respect to the outer circumference wall forming portion.

In particular, it is preferable to bend an inner side of the cable receiving room into an arc shape, for a repulsive force that may be generated between the outer circumference wall forming portion and the sidewall forming portions after the bending can be reduced.

In addition, an elastomer resin of Polyester series or Olefin series may be used as a material of the outer circumference wall forming portion and the sidewall forming portions of the tubular cable protection and guide device of the present invention.

The inner circumference wall forming portions, the outer circumference wall forming portion, and the sidewall forming portions may be formed integrally using different materials by multicolor molding, so as to adjust an engaging force of the inner circumference wall forming portions according to the number of the cables that are to be protected and guided and the rigidity of the cables.

Embodiment

Below a tubular cable protection and guide device 100 of an embodiment of the present invention is described on the basis of FIGS. 1 to 7B.

The tubular cable protection and guide device 100 of this embodiment of the present invention is used for protecting and guiding a cable C or the like, such as an electric cable for transmitting or supplying electric signals or a hose for supplying a liquid or air pressure, which connects a movable portion and a fixed portion of a semiconductor fabrication apparatus, a pharmaceutical development and test apparatus, a vehicle door opening and closing device, a vehicle slide seat, or a vehicle electric sunroof, for example.

The tubular cable protection and guide device 100 is configured in a linear position or a flexional position responsive to a relative distant movement situation of the movable portion and the fixed portion (not shown in the figures).

Figure 5:
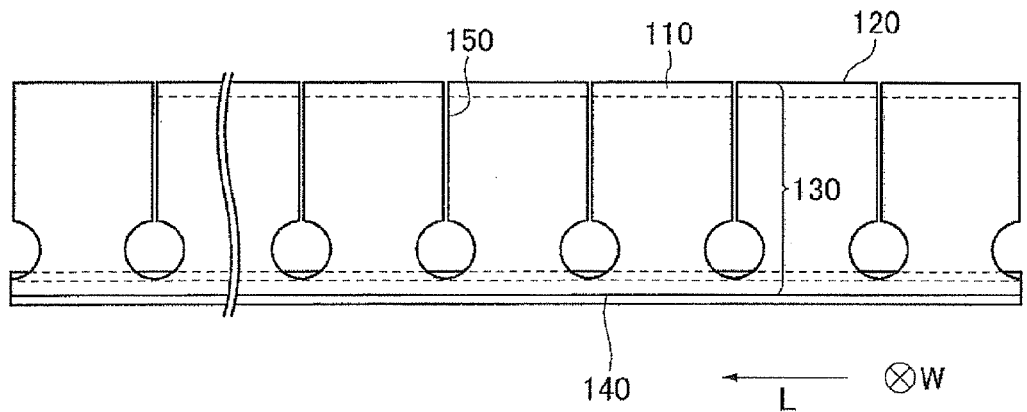
FIG. 5A is a schematic side view illustrating a linear position of the tubular cable protection and guide device.
FIG. 5B is a schematic side view illustrating a flexional position of the tubular cable protection and guide device.
Figure 5:
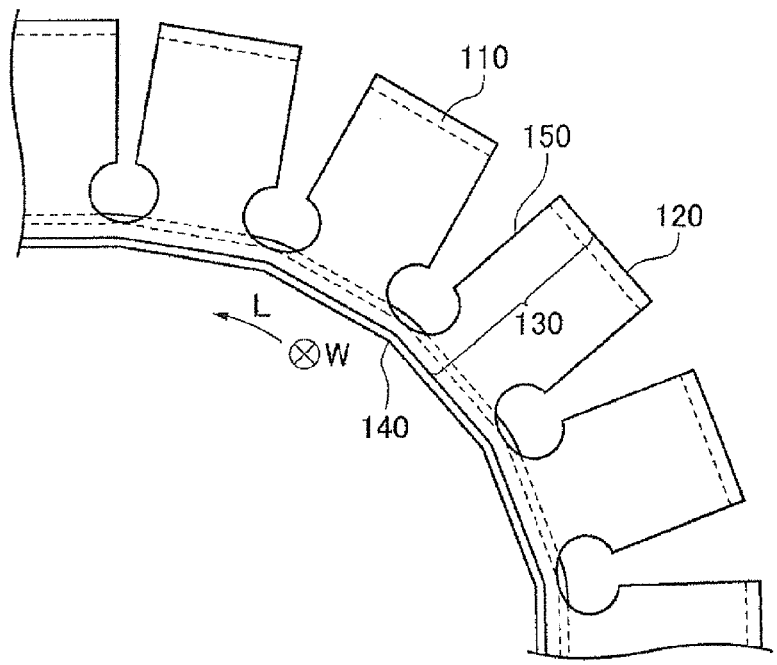
Figure 6:
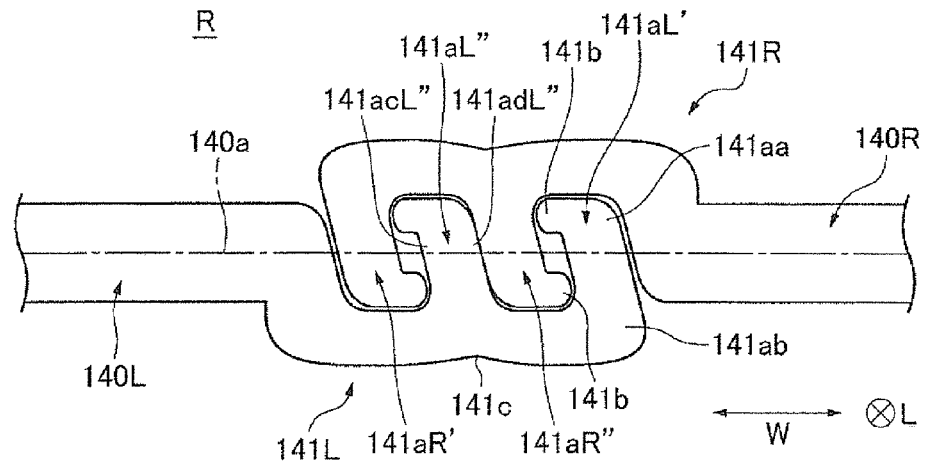
FIG. 6A is a schematic view of a pair of locking portions viewed from a sheet longitudinal direction.
FIG. 6B is a schematic view of the pair of locking portions of FIG. 6A when an outward force is applied to the inner circumference wall forming portions in a transverse direction.
FIG. 6C is a schematic view of the pair of locking portions of FIG. 6B when an outward force is further applied in the transverse direction.
Figure 6:
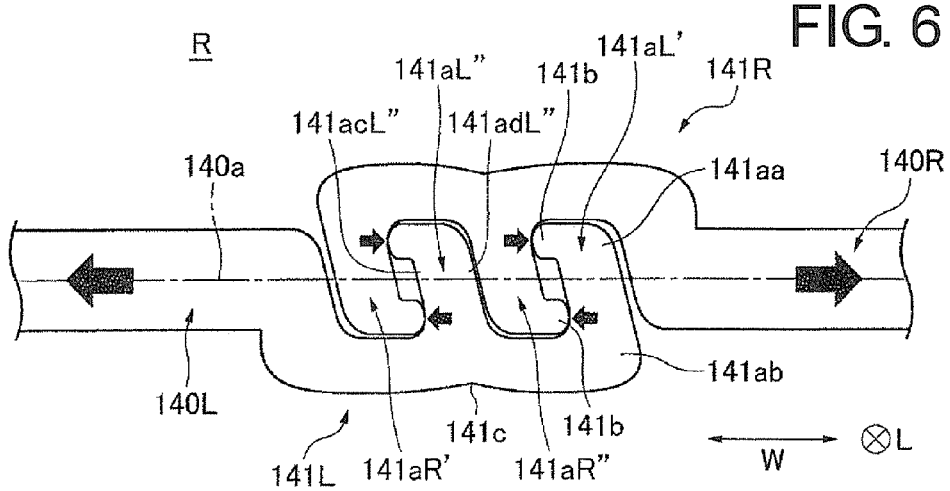
Figure 6:
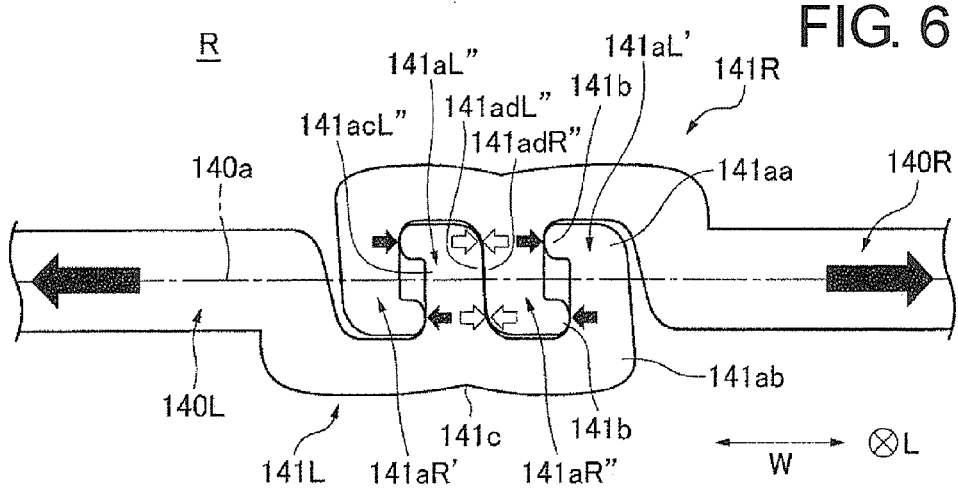
Figure 7:
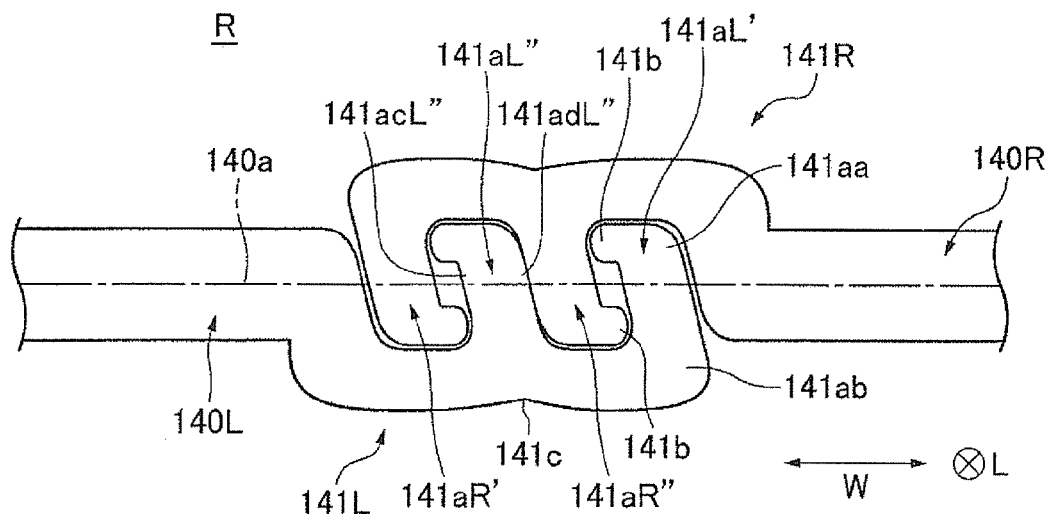
FIG. 7A is a schematic view of a pair of locking portions viewed from the sheet longitudinal direction, the same as FIG. 6A.
FIG. 7B is a schematic view of the pair of locking portions when the tubular cable protection and guide device changes from the state of FIG. 7A to the flexional position.
Figure 7:
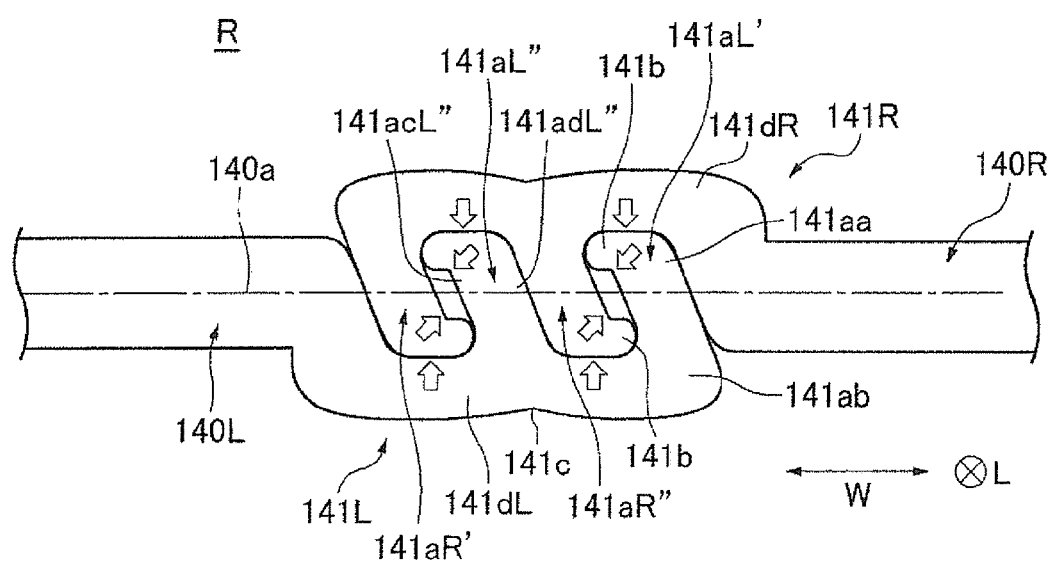

As illustrated in FIG. 1 to FIG. 5B, the tubular cable protection and guide device 100 is configured to receive the cable C along a sheet longitudinal direction L in a cable receiving room R (see FIG. 2 and FIG. 3B especially), formed by bending two sides of a ruler-shaped elastomer resin sheet 100A that is formed by extruding in the sheet longitudinal direction L (see FIG. 1 and FIG. 3A especially), and alternately configured in the linear position (see FIG. 5A) and the flexional position (see FIG. 5B).

In this embodiment, for elements that are formed in pair on the left and right sides, reference numerals of the elements on one side are affixed with the letter "L" while reference numerals of the elements on the other side are affixed with the letter "R" where necessary.

Moreover, the elastomer resin sheet 100A includes an outer circumference wall forming portion 120, a pair of sidewall forming portions 130 on the left and right sides, and inner circumference wall forming portions 140.

The outer circumference wall forming portion 120 is connected in the sheet longitudinal direction L when the tubular cable protection and guide device is in the linear position, and expanded and separated on a flexional outer circumference side at a predetermined pitch in the sheet longitudinal direction L when the tubular cable protection and guide device is in the flexional position.

The sidewall forming portions 130 that are formed in pair on the left and right sides are connected to two sides of the outer circumference wall forming portion 120. When the tubular cable protection and guide device is in the linear position, the respective sidewall forming portion 130 is connected in the sheet longitudinal direction L; and when the tubular cable protection and guide device is in the flexional position, the respective sidewall forming portion 130 is expanded and separated at a predetermined pitch in the sheet longitudinal direction L.

Moreover, the inner circumference wall forming portions 140 are formed integrally with the sidewall forming portions respectively and are disposed vertically to the sidewall forming portions on the left and right sides. When the cable receiving room R is formed, the inner circumference wall forming portions 140 are closed with a pair of locking portions 141 engaged with each other along the sheet longitudinal direction L on a flexional inner circumference side to form a wall facing the outer circumference wall forming portion 120.

More specifically, a bending portion 110 at a boundary between the outer circumference wall forming portion 120 and the respective sidewall folining portion 130 is thin so as to facilitate bending at the bending portion 110.

In addition, a plurality of division slits 150 is formed in the outer circumference wall forming portion 120 and the sidewall forming portions 130 for expanding and separating them when the flexional position is performed, wherein the division slits 150 are equally spaced in the sheet longitudinal direction L and extend in a transverse direction W.

The locking portions 141 that are disposed in pair on the inner circumference wall forming portions 140 each include a plurality of ridges 141a that extend in the sheet longitudinal direction L and is arranged in the transverse direction W when engaged with each other.

When being engaged with each other, as shown in FIG. 6A, the ridges 141a are alternately inserted between each other. Therefore, there are multiple engaged points.

In addition, the thickness of the pair of locking portions 141 is thinner than the thickness of the traditional structure (see FIG. 8B).

A top portion 141 as side of the ridge 141a respectively tilts toward a side of the sidewall forming portion 130, which is connected with the inner circumference wall forming portion 140 with the ridge 141a formed thereon, with respect to a base portion 141ab side of the ridge 141a.

Thus, the ridge 141a tilts like a hook with respect to a vertical direction of a wall of the inner circumference wall forming portion 140.

Furthermore, as illustrated in FIG. 6B, when an outward pulling force in the transverse direction W is applied, the top portion 141aa side of the ridge 141a is respectively caught by and engaged with the base portion 141ab side of another ridge 141a, which strengthens the engagement.

Two sides (i.e. one side 141acL" and the other side 141adL") of at least one ridge 141aL" in the transverse direction W on one locking portion 141L of the pair of locking portions 141 are freely in contact with the ridges 141aR' and 141aR" on the locking portion 141R of the pair of locking portions 141.

Here, the mark "'" is indicative of the first ridge from a front end side of each of the inner circumference wall forming portions 140L and 140R. The mark "''" is indicative of the second ridge from the front end side of each of the inner circumference wall forming portions 140L and 140R. The aforementioned marks are added where required.

Therefore, as shown in FIG. 6C, when a stronger outward pulling force (as the bold arrow in FIG. 6C) in the transverse direction W is applied, the ridge 141aL" on the locking portion 141L is pressed by the ridge 141aR' on the locking portion 141R at an upstream side (left side of the figure) of the force in the transverse direction W and comes in close contact with another ridge 141aR" at a downstream side (right side of the figure) of the force in the transverse direction W, and thus the ridge 141aL" is tightly clamped by multiple ridges 141aR' and 141aR".

To be more specific, the second ridge 141aL" from the front end side of the inner circumference wall forming portion 140L on one side is pressed and deformed by the first ridge 141aR' from the front end side of the inner circumference wall forming portion 140R on the other side and is in close contact with the second ridge 141aR" from the front end side of the inner circumference wall forming portion 140R on the other side.

As a result, the second ridge 141aL" from the front end side of the inner circumference wall forming portion 140L on one side is tightly clamped by the first ridge 141aR' and the second ridge 141aR" from the front end side of the inner circumference wall forming portion 140R on the other side.

Likewise, the second ridge 141aR" from the front end side of the inner circumference wall forming portion 140R on the other side is pressed and deformed by the first ridge 141aL' from the front end side of the inner circumference wall forming portion 140L on one side and is in close contact with the second ridge 141aL" from the front end side of the inner circumference wall forming portion 140L on one side.

As a result, the second ridge 141aR" from the front end side of the inner circumference wall forming portion 140R on the other side is tightly clamped by the first ridge 141aL' and the second ridge 141aL" from the front end side of the inner circumference wall forming portion 140L on one side.

That is, the engagement of the pair of locking portions 141 is strengthened.

Further, in this embodiment, the pair of locking portions 141 each includes a retaining protrusion 141b at the top portion 141aa side of the ridge 141a, wherein the retaining protrusion 141b protrudes toward the side of the sidewall forming portion 130 that is connected with the inner circumference wall forming portion 140 with the ridge 141a thereon.

Therefore, if the outward pulling force in the transverse direction W increases and is separating the engaged locking portions 141, the retaining protrusions 141b of the locking portions 141 are engaged with each other to maintain a relative position relationship thereof.

Moreover, in this embodiment, the pair of locking portions 141 is disposed according to a point symmetry relationship with any point on a thickness center line 140a of the inner circumference wall forming portion 140 as a reference when viewed from the sheet longitudinal direction L.

Therefore, the thickness of the inner circumference wall forming portion 140 on the flexional inner circumference side and the flexional outer circumference side is well distributed and balanced with respect to the thickness center line 140a of the inner circumference wall forming portion 140 to reduce the bending resistance and to avoid generating an excessive force when changing from the linear position to the flexional position.

Besides, in this embodiment, a relatively shallow groove 141c is formed, for example, on an opposite side to the ridges 141a of the pair of locking portions 141 in a flexional inner-outer direction. The groove 141c extends in the sheet longitudinal direction L.

Hence, when engaging the pair of locking portions 141 with each other, the resistance of elastic deformation that is generated when expanding the space between the top portions 141 as of adjacent ridges 141a is reduced.

Further to the above, an engagement state of the pair of locking portions 141 during the change from the linear position (see FIG. 5A) to the flexional position (see FIG. 5B) is explained hereinafter.

When there is no outward pulling force in the transverse direction W, the engagement state of the pair of locking portions 141 in the linear position is shown in FIG. 7A.

Then, when changing to the flexional position (see FIG. 5B), at the flexion, as shown in FIG. 7B, forces are generated to eliminate difference between a flexional outer and inner circumferences with respect to the top portion 141aa side and the base portion 141ab side of the ridge 141a (i.e. forces are applied in directions to cancel each other, wherein the directions refer to directions in which the top portions at the flexional inner circumferences (upper side in FIG. 7B) and the top portions at the flexional outer circumference (lower side in FIG. 7B) face each other).

As a result, the ridge 141a is deformed to tilt toward the top portion 141aa side of the ridge 141a with respect to the base portion 141ab side.

Thus, the ridge 141aL' of the locking portion 141L and the base portion 141dL of the locking portion 141L, which constitutes the wall of the inner circumference wall forming portion 140, clamp the ridge 141aR" of the locking portion 141R that is engaged with the ridge 141aL' on the other side.

Likewise, the ridge 141aL" of the locking portion 141L and the base portion 141dL of the locking portion 141L, which constitutes the wall of the inner circumference wall forming portion 140, clamp the ridge 141aR' of the locking portion 141R that is engaged with the ridge 141aL" on the other side.

Moreover, the ridge 141aR' of the locking portion 141R on the other side and the base portion 141dR of the locking portion 141R, which constitutes the wall of the inner circumference wall forming portion 140, clamp the ridge 141aL' of the locking portion 141L that is engaged with the ridge 141aR".

Likewise, the ridge 141aR" of the locking portion 141R on the other side and the base portion 141dR of the locking portion 141R, which constitutes the wall of the inner circumference wall forming portion 140, clamp the ridge 141aL' of the locking portion 141L that is engaged with the ridge 141aR".

When the tubular cable protection and guide device is in the flexional position, the tilt of the ridges 141a with respect to the vertical direction of the inner circumference wall forming portion 140 is steep and strengthens the engagement.

In the tubular cable protection and guide device 100 of the embodiment of the present invention that is obtained according to the above, the elastomer resin sheet 100A includes the outer circumference wall forming portion 120, the pair of sidewall forming portions 130 on the left and right sides, and the inner circumference wall forming portions 140. The outer circumference wall forming portion 120 is connected in the sheet longitudinal direction L when the linear position is performed, and expanded and separated by the predetermined pitch in the sheet longitudinal direction L on the flexional outer circumference side when the flexional position is performed. The sidewall forming portions 130 are connected with two sides of the outer circumference wall forming portion 120 respectively. Moreover, when the linear position is performed, the respective sidewall forming portion 130 is connected in the sheet longitudinal direction L; and when the flexional position is performed, the respective sidewall forming portion 130 is expanded and separated by the predetermined pitch in the sheet longitudinal direction L. The inner circumference wall forming portions 140 are formed integrally with the respective sidewall forming portions 130 on the left and right sides and are disposed vertically to the sidewall forming portions 130. When the cable receiving room R is formed, the inner circumference wall forming portions 140 are closed with the pair of locking portions 141 engaged with each other along the sheet longitudinal direction L on the flexional inner circumference side, so as to form the wall facing the outer circumference wall forming portion 120. The pair of locking portions 141 each includes a plurality of ridges 141a that extend in the sheet longitudinal direction L and are arranged in the transverse direction W when engaged with each other. When engaged with each other, the ridges 141a are alternately inserted between each other. Thus, disengagement of the locking portions 141 can be prevented even when an outward pulling force in the transverse direction W is applied and the bending resistance in the flexional position can be reduced in comparison with the traditional structure.

Moreover, the top portion 141 as side of the ridge 141a tilts toward the side of the sidewall forming portion 130, which is connected with the inner circumference wall forming portion 140 with the ridge 141a formed thereon, with respect to the base portion 141ab side of the ridge 141a. Therefore, disengagement of the pair of locking portions can be further prevented.

In addition, two sides of at least one ridge 141a in the transverse direction W on one of the pair of locking portions 141 are in contact with multiple ridges 141a on the other one of the pair of locking portions 141. Thus, disengaging the pair of locking portions 141 can be prevented even if an outward pulling force in the transverse direction W is applied.

Further, the pair of locking portions 141 each includes the retaining protrusion 141b that protrudes from the top portion 141aa side of each ridge 141a toward the side of the sidewall forming portion 130 that is connected with the inner circumference wall forming portion 140 with the ridge 141a formed thereon. Thus, even if the outward pulling force in the transverse direction W is large and is pulling the engaged locking portions 141, the engaged locking portions 141 can still be prevented from being separated apart.

The pair of locking portions 141 is disposed in the point symmetry relationship with any point on the thickness center line 140a of the inner circumference wall forming portion 140 as the reference when viewed from the sheet longitudinal direction L. As a result, the tubular cable protection and guide device 100 can be smoothly bent from the linear position to the flexional position.

Moreover, the groove 141c is disposed on the opposite side to the ridges 141a of each of the pair of locking portions 141 in the flexional inner-outer direction, and the groove 141c extends in the sheet longitudinal direction L. Therefore, the space between the top portions 141 as of adjacent ridges 141a can be easily widened to allow the ridges 141a respectively formed on the pair of locking portions 141 to be alternately inserted between each other when engaged, which is particularly effective for assembly.

What is claimed is:

1. A tubular cable protection and guide device alternately configured in a linear position and a flexional position and to receive a cable in a sheet longitudinal direction in a cable receiving room that is formed by bending two sides of a ruler-shaped elastomer resin sheet formed by extruding in the sheet longitudinal direction, the tubular cable protection and guide device comprising:

the elastomer resin sheet, comprising:
an outer circumference wall forming portion that is connected in the sheet longitudinal direction when the tubular cable protection and guide device is in the linear position, and expanded and separated at a predetermined pitch in the sheet longitudinal direction on a flexional outer circumference side when the tubular cable protection and guide device is in the flexional position;
sidewall forming portions formed in pair on left and right sides and connected with two sides of the outer circumference wall forming portion, the sidewall forming portions being connected in the sheet longitudinal direction when the tubular cable protection and guide device is in the linear position and expanded and separated at a predetermined pitch in the sheet longitudinal direction when the tubular cable protection and guide device is in the flexional position; and
inner circumference wall forming portions formed integrally with the sidewall forming portions respectively and disposed vertically to the sidewall forming portions respectively, the inner circumference wall forming portions having a pair of locking portions engaged with each other along the sheet longitudinal direction on a flexional inner circumference side when the cable receiving room is formed, so as to form a wall constructed by the inner circumference wall forming portions facing the outer circumference wall forming portion,
wherein the pair of locking portions each comprises a plurality of ridges extending in the sheet longitudinal direction and arranged in a transverse direction when engaged with each other, and
the plurality of ridges of one of the pair of locking portions are alternatively engaged with the plurality of ridges of the other of the pair of locking portions;
wherein a top portion side of each ridge of the plurality of ridges tilts toward a side of the sidewall forming portion with respect to a base portion side of the each ridge of the plurality of ridges, wherein the side of the sidewall forming portion is connected with the inner circumference wall forming portion with the each ridge of the plurality of ridges formed thereon;
wherein the pair of locking portions each comprises a retaining protrusion that protrudes from the top portion side of each ridge of the plurality of ridges toward a side of the sidewall forming portion that is connected with the inner circumference wall forming portion with the ridge formed thereon.

2. The tubular cable protection and guide device according to claim 1, wherein two sides of at least one ridge of the plurality of ridges in the transverse direction on one of the pair of locking portions are in contact with the plurality of ridges on the other one of the pair of locking portions.

3. The tubular cable protection and guide device according to claim 2, wherein the pair of locking portions is disposed in a point symmetry relationship with any point on a thickness center line of the inner circumference wall forming portion as a reference when viewed from the sheet longitudinal direction.

4. The tubular cable protection and guide device according to claim 2, wherein a groove is disposed on an opposite side to the plurality of ridges of each of the pair of locking portions in a flexional inner-outer direction, and the groove extends in the sheet longitudinal direction.

5. The tubular cable protection and guide device according to claim 1, wherein the pair of locking portions is disposed in a point symmetry relationship with any point on a thickness center line of the inner circumference wall forming portion as a reference when viewed from the sheet longitudinal direction.

6. The tubular cable protection and guide device according to claim 5, wherein a groove is disposed on an opposite side to the plurality of ridges of each of the pair of locking portions in a flexional inner-outer direction, and the groove extends in the sheet longitudinal direction.

7. The tubular cable protection and guide device according to claim 1, wherein a groove is disposed on an opposite side to the plurality of ridges of each of the pair of locking portions in a flexional inner-outer direction, and the groove extends in the sheet longitudinal direction.

* * * * *